April 18, 1950 W. L. W. OGDEN ET AL 2,504,148
AUTOMATIC RELEASE MECHANISM Filed Dec. 2, 1944 5 Sheets-Sheet 1

INVENTORS
ROBERT P. BENNETT
WILLIAM L. W. OGDEN
BY
ATTORNEY

INVENTORS
ROBERT P. BENNETT
WILLIAM L. W. OGDEN
BY
ATTORNEY

April 18, 1950  W. L. W. OGDEN ET AL  2,504,148
AUTOMATIC RELEASE MECHANISM

Filed Dec. 2, 1944  5 Sheets-Sheet 3

INVENTORS
ROBERT P. BENNETT
BY WILLIAM L. W. OGDEN
Ray D Bateman
ATTORNEY

April 18, 1950 W. L. W. OGDEN ET AL 2,504,148
AUTOMATIC RELEASE MECHANISM
Filed Dec. 2, 1944 5 Sheets-Sheet 4

INVENTORS
ROBERT P. BENNETT
BY WILLIAM L. W. OGDEN
Roy D Bateman
ATTORNEY

INVENTOR
ROBERT P. BENNETT
BY WILLIAM L. W. OGDEN
ATTORNEY

Patented Apr. 18, 1950

2,504,148

UNITED STATES PATENT OFFICE 2,504,148

AUTOMATIC RELEASE MECHANISM

William L. W. Ogden, Baltimore, and Robert P. Bennett, Glenarm, Md., assignors to Bendix Aviation Corporation, South Bend, Ind., a corporation of Delaware Application December 2, 1944, Serial No. 566,362

27 Claims. (Cl. 244—150)

The present invention relates to automatic release mechanisms, more particularly to mechanisms for automatically opening a parachute or the like, although it is not limited to such use.

While mechanisms have been heretofore proposed for automatically opening parachutes, they have not proved successful because they either depend upon some manual manipulation for operation and hence are not fool-proof, especially when jumps are made from high altitudes, or else they rely for operation upon a predetermined attitude of fall of the parachutist or upon the attainment of a predetermined velocity of descent or upon other factors which are insufficiently reliable to effect positive opening of the parachute, especially when a jump is made from an altitude sufficient to cause the parachutist to "black out."

It is the primary object of this invention to provide a novel parachute opening mechanism which will automatically open the parachute when the parachutist has fallen to a predetermined altitude, or through a predetermined distance, which is positive in its action and will properly operate irrespective of the attitude of the parachutist, and is so designed that it will not interfere with normal manual operation of the parachute releasing mechanism, and which is of simple, efficient construction.

Another important object is to provide a novel release mechanism which will automatically produce a positive releasing action in response to barometric pressures of predetermined magnitude, and which is not dependent upon velocity of descent or any other factor for its operation.

A further important object of the invention is to provide an explosive type release mechanism with a novel explosive unit in which the products of the explosion are contained in a flexible, non-rupturable chamber, which undergoes expansion in response to the explosive pressures and produces the desired actuation.

Another object is to provide a release mechanism embodying a fluid pressure actuated motor having a stroke of predetermined magnitude and having a device operatively connected to said motor and operable to produce a motion having a magnitude materially greater than the stroke of the motor.

A further object is to provide a barometric switch of novel construction, embodying means for adjustably varying the pressure at which it will open or close a circuit.

Another object is to provide a parachute opening mechanism which is fully automatic in its action and embodies a manually operable device for selectively cutting out the automatic action and placing it under fully manual control.

A further object is to provide a novel pressure responsive switch assembly in which the point at which switch actuation will occur may be variably adjusted in definite steps in terms of altitude, and yet when the transition from one altitude adjustment to another is effected there will be no return of the mechanism to an altitude lower than either of those between which it is being adjusted.

Further objects are to provide additional improved and refined features of parachute opening mechanisms, which will become apparent as the specification proceeds in conjunction with the annexed drawings, and from the appended claims.

With continued reference to the drawings, in which like reference characters have been employed to designate similar parts throughout the several views, the invention has been illustrated as being applied to a parachute pack 10, having a pair of end flaps 11 and 12 embodying elastic cords of the "shock-cord" type 13 and 14 respectively, which terminate in apertured brackets 15 and 16. The latter fit over apertured pins 17 and 18, which project through eyelets provided in a side panel 19 of canvas or the like. Pins 17 and 18 are anchored to a side panel 20. Panel 19 is secured to the parachute pack by means of elastic cords 21 and 22, which are fastened at their opposite ends to flap 20.

Figure 1:
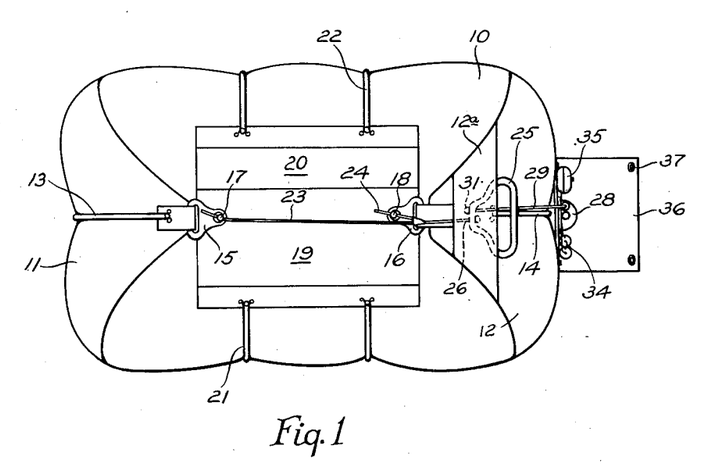
Figure 1 is a top plan view showing the invention applied to a parachute pack.

When members 15 and 16 are freed from pins 17 and 18 it is apparent that flaps 11, 12, 19 and 20 are released and the parachute will open in conventional manner. Members 15 and 16 are releasably held in place on members 17 and 18 by means of rods or wires 23 and 24 respectively, which pass through openings in members 17 and 18 and, as seen in Figure 1, are joined together adjacent a release handle 25. The main release member 26 passes through an opening in the handle and has a ball-shaped abutment secured to its end, whereby movement of the handle to the right in Figure 1 is operable to release both members 23 and 24 from their respective pins 17 and 18. A strip 12a is sewed over flap 12, so as to maintain handle 25 in cooperative relationship.

We have found that by associating with release handle 25 a novel automatic release mechanism, which will now be described, a construction is achieved in which the parachute will be automatically and positively opened when the parachutist has fallen to a predetermined altitude, or through a predetermined distance, and which is solely responsive to barometric changes and is not dependent upon the velocity of descent or any other factor for its operation.

Figure 2:
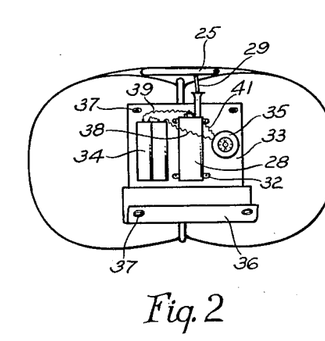
Figure 2 is a view of the device shown in Figure 1, as it appears when viewed from the right-hand end of that view.
Figure 3:
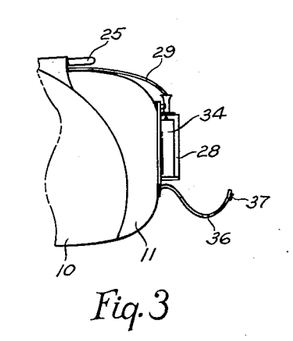
Figure 3 is a fragmental elevational side view of the device shown in Figures 1 and 2.

With continued reference to Figures 1, 2 and 3, the mechanism comprises an explosive actuator unit 28 having a cable 29 slidably fitting in an aperture in handle 25 and provided with a ball-shaped abutment 31 on its free end, whereby a pull upon cable 29 will move handle 25 into its release position, and yet if handle 25 is manually pulled to the right, cable 29 will not interfere with such operation.

Unit 28 is secured as by means of ears 32 or the like to a mounting or foundation plate 33, which in turn is secured to the parachute pack in any suitable manner. Also secured to member 33 in any suitable manner is a pair of batteries 34, which may be ordinary dry cells, and a pressure responsive switch 35. The actuator assembly may be enclosed by a canvas flap 36 sewed at one edge to the parachute pack and detachably fastened at its other edge to the pack by means of separable fasteners 37.

Batteries 34 are connected in series to the pressure switch by means of a lead 38, and to the actuator unit by means of a lead 39. The pressure switch is grounded to the actuator frame or housing by means of a lead 41, which completes the circuit when the switch is closed.

Figure 4:
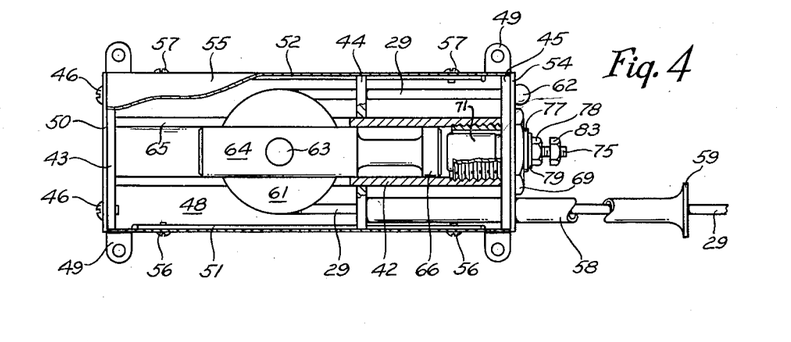
Figure 4 is a longitudinal sectional view through the explosive actuator unit of the device shown in Figure 1.
Figure 5:
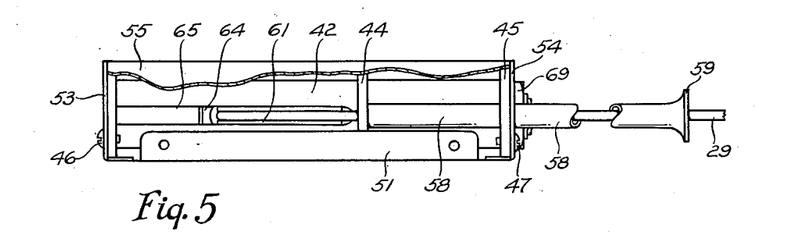
Figure 5 is a side elevational view of the unit shown in Figure 4, with the casing broken away to more clearly illustrate the structure.

Referring now to Figures 4, 5, 6 and 10, the actuator unit comprises a cylindrical tube 42 to which plates 43, 44, and 45 are secured in any suitable manner as by means of solder, brazing or the like. Secured to end plates 43 and 45, by means of screws 46 and 47, is a sheet metal base member 48 having mounting lugs 49 at its corners and upturned flanges 51 and 52 along its opposite side edges. As seen in Figures 4 and 5, the base is also provided with end walls 53 and 54, which cooperate with a shell like cover 55 to totally enclose the mechanism, and it is held in place by screws 56 and 57 threaded into flanges 51 and 52 respectively.

Passing through alined openings in plates 44 and 45, and rigidly secured therein is a tube 58 having a flaring mouth 59 and which receives a parachute operating cable 29. As seen more particularly in Figure 4, cable 29, upon emerging from tube 58 passes around a pulley 61 and thence through openings in plates 44 and 45. Its free end is anchored against the face of plate 54 in any suitable manner, as by providing a knot on its end. Preferably the cable is of a metallic stranded form and has a ball-like abutment 62 rigidly secured to its end.

Pulley 61 is journaled on a pin 63 carried by a plunger 64 which is mounted for endwise reciprocation in tube 42, it being particularly observed that the tube is provided with a slot 65 and the pulley, in projecting therethrough, keys or restrains plunger 64 against rotation about its axis. Plunger 64 is provided with a piston 66 which projects into the unslotted portion of tube 42, the latter constituting the cylinder in which the actuating fluid pressures are developed, in the manner that will now be set forth.

Figures 6, 10:
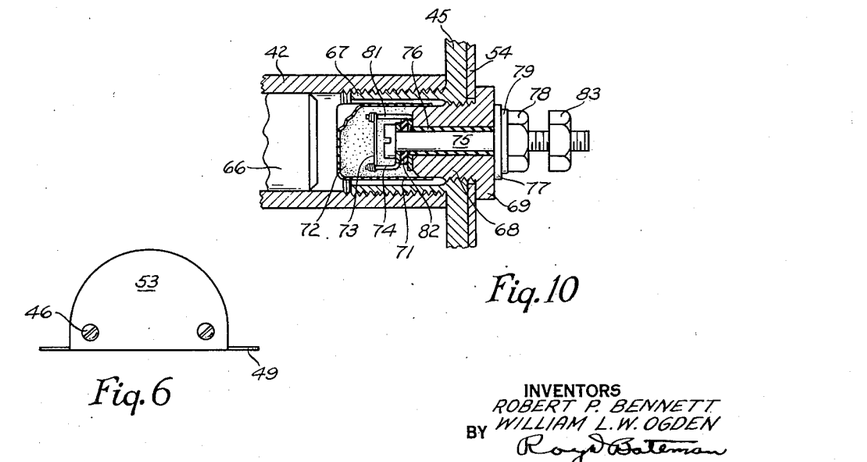
Figure 6 is an end elevational view of the unit shown in Figure 5.
Figure 10 is an enlarged fragmental sectional view showing the manner in which the powder charge is associated with the cylinder and the hot wire detonator.

Referring to Figure 10, tube 42 is tightly threaded onto a threaded sleeve 67 which is secured to or formed on plate 45, and threaded into the latter is a detonator body 68 having a nut portion 69 by which it may be tightly threaded into abutting engagement with end portion 54 of the foundation plate. Frictionally fitting over the inner end of member 68 is a cup shaped receptacle 71, of plastic or other suitable easily rupturing material, and containing a powder charge 72. The powder charge may be exploded in any suitable manner, but we preferably employ a hot wire 73 which is heated by the dry or other cells in response to closure of the pressure operated switch. Wire 73 is secured at one end to an insulated finger 74 carried under the head of bolt or screw 75. The latter projects centrally through member 68 and is insulated therefrom by a non-conductive bushing 76 and an insulating washer 77. Screw 75 is locked in place by a nut 78 and a lock washer 79.

The other end of wire 73 is carried by a finger 81 which is insulated from finger 74 by an insulating washer 82 and is clamped directly against the end of member 68, so as to make electrical contact therewith. Lead 39 may be secured to screw 75 by means of a nut 83.

From the foregoing disclosure it is apparent that heating of wire 73 in response to the passage of current will set off powder charge 72, thereby rupturing member 71 and developing a fluid pressure in tube 42 of sufficient magnitude to drive piston 66 and connected plunger 64 and pulley 61 to the left in Figure 4, where it may contact plate 43, the latter limiting its travel. The end of cable 29 which is connected to handle 25, is as the result of the foregoing travel of piston 66, caused to be displaced a distance twice as great as the travel of plunger 64, by reason of pulley 61 and the fact that the opposite end of cable 29 is anchored to the case. It is to be understood however that the invention is not limited to use of a pulley as a stationary guide, such as a curved trough, may be employed to reverse the direction of pull of the cable, if desired.

It is accordingly apparent that handle 25 is actuated by the plunger and cable sufficiently to insure opening of the parachute, and that by employing the pulley and cable combination disclosed, it is possible to construct the explosive unit of comparatively short overall axial length, thereby making for compactness. One of the novel pressure operated switches of the invention, which may be employed to automatically complete the circuit, will now be described.

Figure 7:
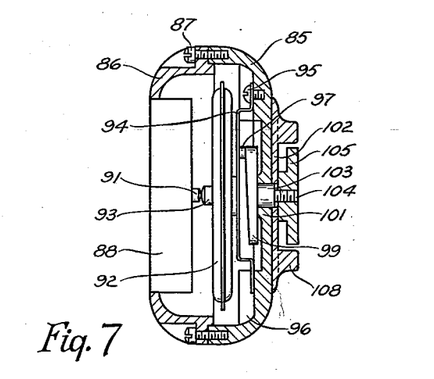
Figure 7 is a diametrical cross sectional view of one form of pressure actuated switch of the invention.
Figure 8:
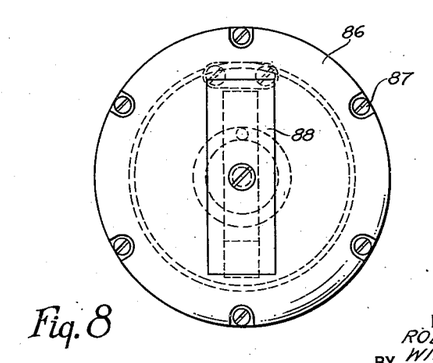
Figure 8 is a rear elevational view of the pressure switch of Figure 7, illustrating it as it appears when viewed from the left hand side of that figure.
Figure 9:
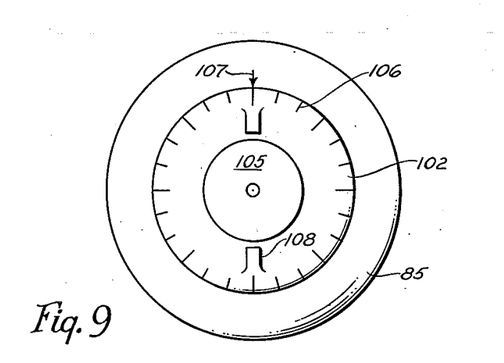
Figure 9 is a front elevational view of the pressure switch of Figure 7, illustrating it as it appears when viewed from the right hand side of that figure.

Referring now to Figures 7, 8 and 9, the pressure switch comprises a casing made up of front and rear sections 85 and 86 detachably secured together by screws 87. A snap or any other well known suitable type of switch 88, mounted in an appropriately shaped opening in casing section 86, embodies a spring-urged operating plunger 91, and in the position of parts illustrated is disposed in circuit-breaking position. Predetermined movement of plunger 91 to the right, under the influence of its spring, is operable to close the circuit. Plunger 91 is automatically operated in response to barometric pressure changes by means of a bellows 92 carrying a pin 93 coacting with plunger 91. Bellows 92 is mounted upon a spring finger 94 which is anchored to front casing section 85 at one end by a screw 95. The other end of finger 94 merely seats in a recess in casing 85, whose side walls guide it for movement toward and away from the front of the casing.

The device may be adjusted to close switch 88 at any desired altitude by pivoting finger 94 about its anchored end, so as to adjust bellows 92 towards and away from switch 88. To this end finger 94 is provided with a projection 97 which coacts with an axially facing cam surface provided on a cam 99. The latter is journaled for rotation in a boss 101 in casing section 85, and is splined or otherwise non-rotatably secured to a dial 102 at 103. The cam has a threaded shank 104 on which a knurled nut 105 is threaded. Accordingly, when the desired pressure adjustment has been made by rotating dial 102 and cam 99, the parts may be locked in adjusted position by tightening nut 105. Dial 102 may be provided with suitable graduations 106, which cooperate with index mark 107 on the case, to achieve the proper pressure setting, a pair of ears 108 on the dial facilitating rotation thereof.

From the foregoing disclosure it is accordingly apparent that should a jump be made, at a predetermined point in the descent the increasing atmospheric pressure will compress bellows 92 and cause its pin 93 to move to the right (Figure 7) and plunger 91 of switch 88 in following this movement under the influence of its spring will close the circuit, with the result that wire 73 will be heated and the powder set off, thereby automatically opening the parachute in the manner previously discussed.

In some instances it may be desirable to "disarm" or prevent the device from operating until a manual switch is closed, especially where, in the normal use of the parachute, wide variations in altitude are frequently encountered. In Figures 11 to 15 inclusive there is disclosed a modification of the invention in which a manual switch, located in series with the pressure responsive switch, must be actuated before the device can be placed in operation. The switch shown is also of modified construction, and embodies additional advantages over the one previously described.

With continued reference to Figures 11 to 15 inclusive, a two-part casing made up of a base section 111 and a cover section 112, and secured together by screws 110, houses the parts of the switch. A switch 113, having a spring-urged actuating plunger 114, is secured in base section 111 by screws 115, or in any other suitable manner. A pressure responsive bellows 116 is carried by a bowed flexible metal strip 117, and has a boss or pin 118 cooperating with plunger 114. Strip 117 is rigidly anchored at one end by a pair of screws 119 threaded into cover section 112. The other end of strip 117 is provided with a pair of slots 121 and a pair of screws 122 cooperate with them to guide the free end of the strip for longitudinal movement in response to flexure thereof under the influence of the cam setting device, which will now be described.

Figures 11, 16:
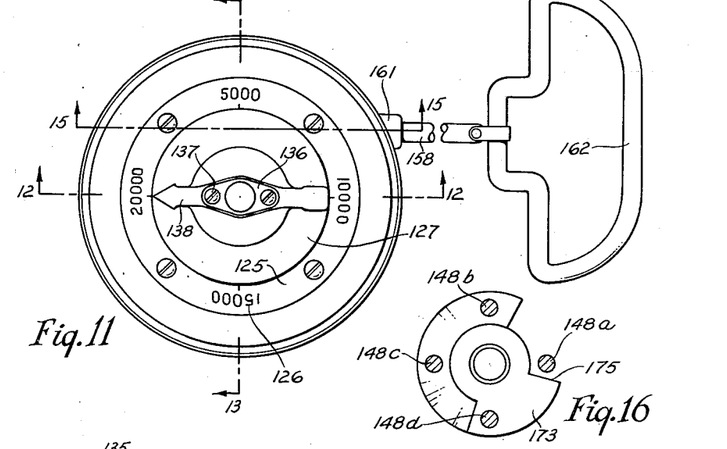
Figure 11 is a front elevational view illustrating a modified form of pressure switch also forming part of the invention.
Figure 16 is a fragmental side elevational view showing a modified form of cam assembly for use in the switch of Figures 11 to 15 inclusive.
Figure 12:
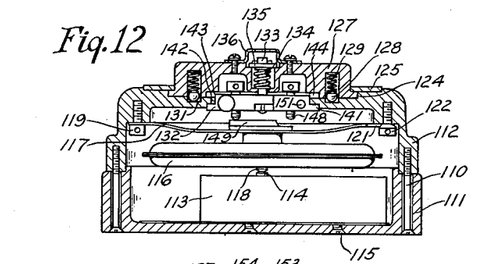
Figure 12 is a sectional view taken substantially on the line 12—12 of Figure 11.

Mounted for rotation in a recess 124 in the upper face of the cover, and retained in place by a ring 125, having pressure graduations 126, is a setting member or knob 127. The latter is preferably provided with a detent assembly for giving the operator a definite indication when the knob is disposed in any one of its four major operative positions. The detent assembly shown comprises a plurality of balls 128 backed up by springs 129 located in bores in the knob. The detent balls cooperate with a groove having a plurality of depressions 131 provided in the cover.

Figure 14:
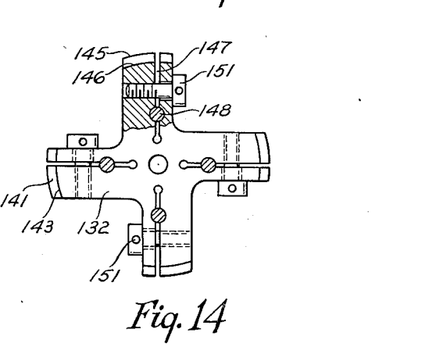
Figure 14 is a top plan view, with parts broken away and in section, illustrating the spider assembly shown in Figure 12.

Mounted for unitary rotation with the knob assembly is a four armed spider 132, shown more clearly in Figure 14. The spider is carried by a pin 133 and is urged upwardly by a compression spring 134 located in a recess in the knob and bearing against a washer 135. The latter is carried by pin 133 and the assembly is enclosed by cap 136 secured to the knob by screws 137. As seen more clearly in Figure 11, the upper surface of the knob is provided with an arrow formation 138, which cooperates with the graduations 126 to indicate the setting of the spider.

As seen in Figure 12, the outer end of each spider arm is provided with a notch or recess 141 which rides in a groove 142 formed inside the cover. The spider is keyed to the knob by reason of the fact that the corner designated 143 of each arm projects upwardly beyond the outer face of the cover and seats in a pocket-like recess 144 provided in the knob.

From the foregoing disclosure it is apparent that the spider is urged upwardly at all times by spring 134, and is positively keyed to the knob, whereby the indications of arrow 138 will accurately reflect the angular position of the spider at all times. It should also be observed that the outer surfaces 145 and 146 of the spider arms are of cylindrical form and cooperate in journaled relationship with groove 142 of the cover, whereby the spider is accurately centered independently of pin 133.

Each spider arm is provided with a slot 147, and tapped in the walls of each slot is a screw 148. Screws 148 are adjusted to different heights, so as to define a helix, and their lower ends cooperate in camming relationship with a stationary ramp or cam 149 secured to strip 117. Cam 149 has an inclined portion and a flat portion, and the parts are so designed that when the knob is in any one of its four positions, one of the screws 148 will rest upon the flat portion of cam 149, whereby the pressure at which the switch will be actuated may be accurately predetermined. When the screws 148 have been properly adjusted they are locked in adjusted position by set screws 151, which pull the two halves of each arm into clamping engagement with screws 148. The preferred form of switch device for rendering the mechanism operative or inoperative at will is constructed as follows.

Secured to housing section 111 by screws 153 is a switch assembly made up of a pair of flexible arms 154 and 155 carrying contacts 156. Arms 154 and 155 are provided with reversely bent portions 157 adjacent the contacts, and cooperating therewith is a plunger 158 constructed of insulating material and carrying a knob 159 at its end. Member 158 is guided for longitudinal movement in a tube 161 also carried by the switch assembly and projecting outwardly through an opening in the casing. As seen in Figure 11 plunger 158 has a handle 162 pivotly secured thereto.

Figure 15:
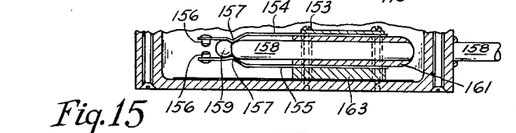
Figure 15 is a fragmental sectional view taken substantially along the line 15—15 of Figure 11, illustrating the device for closing the contacts.

From the foregoing it is apparent that in the position of the parts illustrated in Figures 11 and 15, plunger 158 maintains contacts 156 open, and that the plunger is yieldingly retained in the device by reason of reversely curved portions 157 engaging the annular groove adjacent the end of the plunger. Arms 154 and 155 are so constructed that when handle 162 is grasped and pulled, and plunger 158 removed, they will bring contacts 156 into firm engagement.

Figure 13:
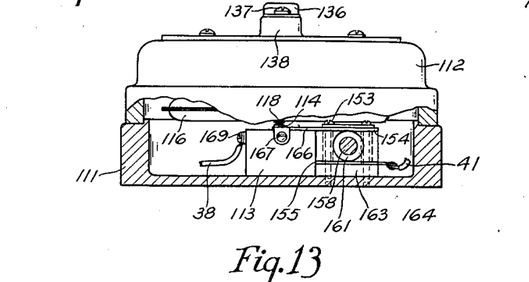
Figure 13 is a sectional view taken substantially on the line 13—13 of Figure 11, when viewed in the direction of the arrows.

The switch assembly is completed by an insulating block 163 which seats against the base. As seen in Figure 13, contact arm 155 is provided with an ear 164 to which the lead 41 (of Figure 2) is secured. Contact arm 154 is provided with a side arm 166 which is secured to one terminal of switch 113 by means of a screw 167. The other lead 38 (of Figure 2) is secured to the other terminal of switch 113 by a screw 169.

It is accordingly apparent that the two switch devices are disposed in series and that when leads 41 and 38 are connected to the body of actuator unit 28 and to batteries 34 as shown in Figure 2, it is necessary to grasp handle 162 and remove plunger 158 before the pressure responsive switch may be operated.

Ring 25 has been illustrated as graduated in terms of altitude from 5,000 to 20,000 feet, but it is to be understood that it may carry other graduations as desired, depending upon the use to which the device is to be put. In the form of switch illustrated in Figures 11 to 15 inclusive, operating knob 127 is designed to be placed in one of four major operative positions, inasmuch as cam 149 is of insufficient angular extent to coact with screws 148 when it is disposed between two of them.

In some instances it may be desirable to utilize an adjusting screw and cam assembly in which there is a progressive adjustment of the bellows, with no retraction between any of its major positions. While this feature is present in the form of switch illustrated in Figures 7, 8 and 9, we have in Figures 16 and 17 illustrated a modified form of cam mechanism which may be applied to the switch of Figures 11 to 15 inclusive, thereby combining the progressive adjustment feature with the advantage of providing for accurate independent calibration of the instrument at each of the several major positions of the adjustment knob.

Figure 17:
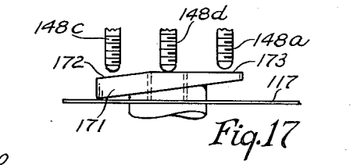
Figure 17 is a top plan view of the cam of Figure 16, the actuating screws being shown in section in the relative positions of Figure 16.

With continued reference to Figures 16 and 17, screws 148 are adjusted, as in the switch of Figures 11 to 15 inclusive, so that their free ends lie substantially in a helical path, the axis of which coincides with the axis of rotation of the assembly. A cam 171 is secured to strip 117 in the same manner as cam 149, but in this instance it is provided with a helical face 172, which cooperates with the ends of screws 148 to prevent the bellows from dropping back when adjustment is made from one pressure to another.

As seen in Figure 16, helical portion 172 of the cam is approximately 180° in angular extent and merges at its upper end into a flat portion 173 disposed normal to its axis. In Figures 16 and 17 the several adjusting screws have been designated 148a, 148b, 148c and 148d for the purpose of individually identifying them in the following description of operation.

Assuming that the parts are in the positions illustrated in Figures 16 and 17, screw 148d, which is shown in a position of rest on flat surface 173, determines the pressure at which the switch will operate. It should be observed that because the pitch of helical surface 172 is greater than the pitch of the helical path defined by the free ends of the screws, screw 148c is spaced from inclined face 172, whereas screw 148a has been raised above the plane of flat surface 173. The parts are preferably so designed that the junction between surfaces 172 and 173 is disposed approximately 15° from the axis of the adjusting screws when either of them is disposed in pressure setting position.

With the parts in the positions just described, if it is decided to set the switch for a lower altitude, knob 127 is rotated counter-clockwise (Figures 11 to 17) through 90°. During the first portion of the foregoing travel of knob 127, screw 148d merely rides over flat surface 173 and produces no change in the position of the bellows. However, at the end of a predetermined angular travel of knob 127, adjusting screw 148c engages and rides up on inclined surface 172, thereby producing travel of strip 117 and the bellows carried thereby. This also causes flat surface 173 to move away from screw 148d. The exact point at which the successive screws will strike inclined face 172 of the cam will depend upon the respective pitches of the latter and the helical path defined between ends of the screws. In any event, the pitch of surface 172 is the greater, and thereby produces the highly desirable operation just discussed. If the two pitches were exactly equal it is apparent that two of the screws could bear upon surface 172 simultaneously, and there would be no successive stepping up in response to counter-clockwise adjustment of knob 127. If it is desired to increase the altitude setting, knob 127 is rotated clockwise, which causes the screws to successively ride down the inclined surface until the proper screw is brought to bear upon flat surface 173.

From the foregoing it is apparent that the four adjusting screws may be successively adjusted from one pressure to another without dropping back to a lower pressure in between the two points of adjustment. In other words, the pressure setting in between any two adjacent major settings of knob 127 will be at least as great as the lower of the two pressures, and it is also possible to secure pressure settings intermediate the four major settings illustrated by rotating knob 127 sufficiently to cause the screws to ride up on inclined portion 172 of the cam to various degrees.

Stop means (not shown) is provided for limiting rotation of knob 127 to slightly less than 360°, so that there is no possibility of the longest screw 148 locking behind free edge 175 of the cam.

From the foregoing disclosure it is apparent that the invention provides automatic release mechanisms which will automatically open the parachute when the parachutist has fallen to a predetermined altitude or through a predetermined distance, and which is positive in its action and will properly operate irrespective of the attitude of the parachutist, and is so designed that it will not interfere with the normal manual operation of the parachute releasing mechanism, and which is of simple efficient construction, and that the invention also provides novel pressure responsive switch mechanisms which, while being of particular value in the parachute releasing mechanism disclosed, are also capable of other uses, which will occur to those skilled in the art.

In Figures 18 to 21 inclusive we have illustrated a modified explosive actuator also forming part of the invention and which differs from the one previously described, primarily in that the piston and cylinder have been replaced by a flexible bellows, which retains the burning powder particles and the other products of combustion, thereby providing a device which is extremely safe and may be utilized in installations where there is danger of fire or explosion.

Figure 18:
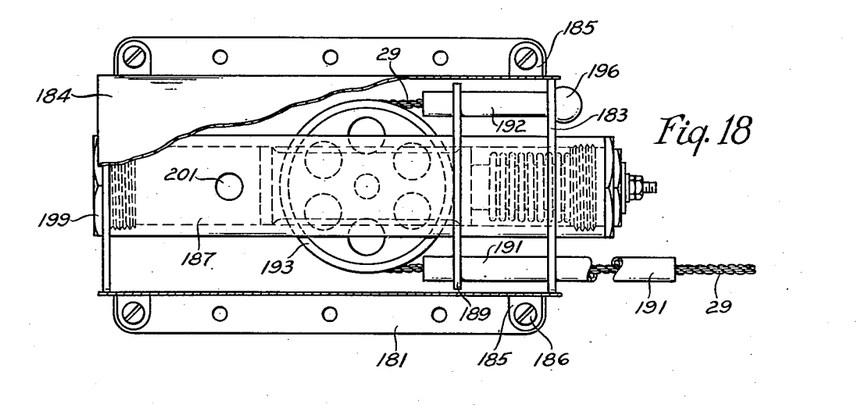
Figure 18 is an elevational view, with parts in section, of a modified form of explosive actuator unit of the invention.
Figure 19:
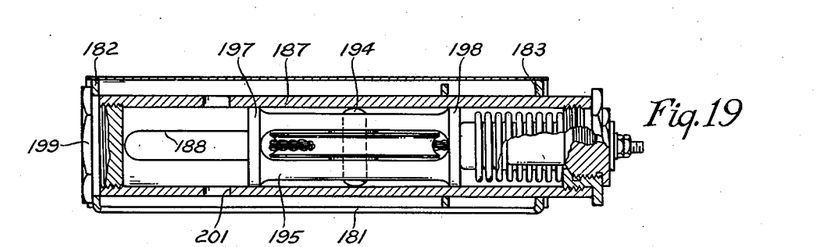
Figure 19 is a longitudinal sectional view of the unit shown in Figure 18.

With continued reference to these figures, the frame assembly of this device is constructed somewhat differently than the one previously described. It embodies a base plate 181 having upturned ends 182 and 183. A cover 184 of curved form fits over end plates 182 and 183 and houses the parts. It may be secured to base 181 in any suitable manner, as for instance, by means of ears 185 and screws 186.

Secured in alined openings in end plates 182 and 183, as by welding, is a sleeve or tube 187 having a longitudinal slot 188. The explosive unit is screwed into the end of cylinder 187 as a removable and replaceable unit, in the manner to be hereinafter described.

Secured to cylinder 187 is a plate 189 and passing through alined openings therein, and in plate 183 are a pair of tubes 191 and 192. The former functions to guide actuator cable 29 around pulley 193, which is journaled on a pin 194 in plunger 195, and tube 192 guides the cable exteriorly of the unit where it is provided with an abutment 196. In this instance the plunger performs no piston functions and therefore is merely provided with a pair of guiding formations 197 and 198.

The end of cylinder 187 is closed by plug 199, and it should be observed that with the plug in place it is impossible to move plunger 195 sufficiently to the left to permit pin 194 to be removed through either of the alined openings 201 of the cylinder. This makes it unnecessary to separately lock pin 194 in place.

Figure 20:
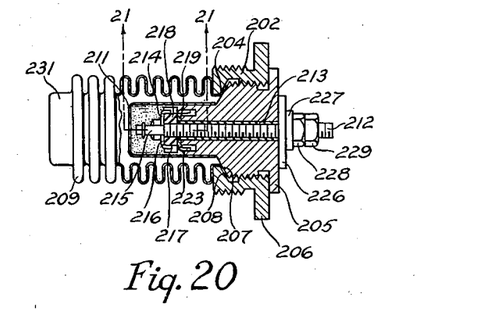
Figure 20 is a longitudinal sectional view, on an enlarged scale, of the expansible chamber assembly of the device shown in Figures 18 and 19.
Figure 21:
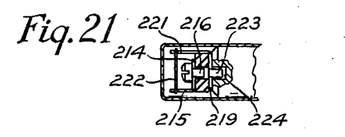
Figure 21 is a fragmental sectional view taken substantially on the line 21—21 of Figure 20, looking in the direction of the arrows.
Figure 22:
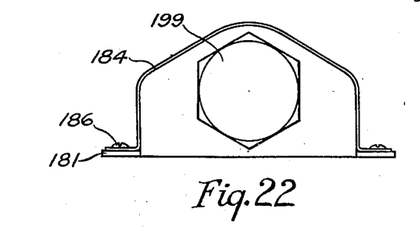
Figure 22 is an end elevation thereof.

The explosive unit is shown more particularly in Figures 20 and 21. It comprises a flanged member 202 which is threaded into the end of cylinder 187 and is provided with a nut portion 203 and a conical internal face 204. Threaded into member 202 is a plug member 205 having a nut portion 206 and a conical face 207.

During assembly of the device the neck 208 of a flexible bellows unit 209 is spun into place on conical seat 204, with the result that when plug 205 is threaded home, the bellows will be firmly gripped between conical faces 204 and 207, in gas-tight relationship therewith.

The powder charge is contained in a plastic cap 211 in the same manner as before, but in this instance a modified type of detonator is employed, which will now be described.

Clamped under the head of a screw 212, which passes centrally through plug 205 and is insulated therefrom by a bushing 213, is a washerlike member 214 having an upturned ear 215, which forms an electrode. Member 214 is also provided with a pair of downturned lugs 216 which fit into slots 217 provided in an insulating member 218. Member 218 seats against a similar washerlike element 219, having an electrode forming ear 221 which, as seen in Figure 21, is of sufficiently greater length than ear 215 so that the heater wire element 222 may be strung between them as shown, the ends of the electrodes being bent back upon themselves to grip the wire, as shown.

Member 219 is provided with a pair of lugs 223 which seat in a pair of recesses 224 formed in the end of member 205.

From the foregoing it is apparent that the lug and washer assemblies maintain the several parts in proper angular relationship, and that electrode 215 is insulated from plug 205 while electrode 221 is electrically grounded thereto.

Screw 212 is locked in place by means of an insulating washer 226, a lock washer 227 and a nut 228. Lead 39 (of Figure 2) may be electrically connected to the screw by means of a nut 229.

This form of actuator structure of the invention functions in substantially the same way as the one previously described, except that it possesses the further highly desirable advantage of confining the products of combustion to the interior of flexible bellows 209. When the powder charge is exploded cap 211 is ruptured and the full pressure of the explosion is transmitted to the interior of the bellows. The bellows expands and its end 231 acts directly against the end of plunger 195 to displace it and effect operation of the cable 29 in the manner previously set forth. It should be particularly observed that during this operation the internal walls of cylinder 187 function as an effective guide to confine the bellows to straight line expansion, thereby insuring that the full force of the explosion will be effectively utilized, inasmuch as the quantity of powder enclosed within cap 211 is carefully calculated to produce full expansion of the bellows without effecting rupture thereof.

A further advantage is that the entire explosive assembly may be removed as a unit from tube 187 and be replaced by a new unit, to again place the device in condition for operation. Also, the individual units may be reconditioned by unscrewing plug 205, and cap 211 containing the proper powder charge, and reassembling the parts.

While we have disclosed, and prefer to employ pressure switches embodying cam devices for adjusting the pressure at which they will operate, because the altitude scale may be made linear by properly contouring the cam (Figure 7) or the ends of the adjusting screws (Figures 11 to 17 inclusive), it is to be understood that in the event that scale linearity is not required, a simple screw, rigidly secured to the bellows, and adjustably threaded into a nut formation on the case 112 may be used, if desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced thereby.

What is claimed, and desired to be secured by United States Letters Patent is:

1. In a barometric circuit controlling device, a sectional casing; a flexible finger carried at one end by one of said sections, a rotatable assembly journaled in said one casing section and embodying means engaging said flexible finger and operable to adjustably maintain it in various degrees of flexure; a pressure-responsive unit carried by said finger at a point spaced from its point of connection to said casing section and having an actuator member facing toward said other casing section; and a switch carried by said other casing section and coacting with the actuator member of said pressure responsive unit.

2. The circuit controlling device defined in claim 1, wherein said rotatable assembly is rotatable about an axis disposed substantially parallel to the axis of said pressure responsive unit and embodies an axially facing cam surface which coacts with said finger.

3. In a parachute opening apparatus, a parachute actuator embodying expansible chamber means and a charge of powder for expanding said expansible chamber means, electrically actuated means for energizing said charge of powder, comprising a circuit including a source of electricity; a barometrically operated switch; and a manually operable switch disposed in series, whereby both switches must be closed in order to energize said parachute actuator.

4. The parachute opening apparatus defined in claim 3, wherein said manual switch comprises a pair of spring fingers carrying contacts at their free ends, and an insulating member normally disposed between said members and holding said contacts apart, said fingers and said member having cooperating portions which are operable to yieldingly hold said insulating member in switch-opening position.

5. In a pressure responsive switch, a casing; a bellows unit and a switch disposed in cooperative relationship in said casing; means mounting said bellows unit for movement toward and away from said switch, to predetermine the pressure at which said switch will operate; and means for adjusting said bellows unit, comprising a member mounted for rotation adjacent said bellows unit and having a plurality of elements projecting toward said bellows unit, said elements being adjustable so that they may terminate at different points from said bellows, and a cam provided on said bellows adjacent said elements and cooperating therewith to move said bellows toward and away from said switch in response to rotation of said member in one direction or the other.

6. The pressure responsive switch defined in claim 5, wherein said cam means is provided with a flat portion and a merging inclined portion; and means are provided for yieldingly holding said member in such position as to cause one of said elements to bear upon the flat portion of said cam, whereby the apparatus may be individually calibrated for the several pressures at which it may be set to operate, by successively locating each of said elements on said cam and so adjusting the element as to cause the switch to be operated at the particular pressure indicated by the angular position of said member.

7. In a pressure responsive switch, a casing; a bellows unit and switch means mounted in said casing in cooperative relationship, said bellows unit being adapted to undergo limited movement toward and away from said switch, for the purpose of predetermining the pressure at which said switch will operate, means for adjusting said bellows unit, comprising a member mounted for rotation in said casing and having an operating knob located exteriorly of said casing, a plurality of elements mounted in said member and projecting toward, and having their free ends terminating different distances from said bellows unit, and cam means on said bellows unit cooperating in contacting engagement with said elements, said cam means comprising a flat face disposed normal to the axis of rotation of said member and including means for preventing said bellows from undergoing retrograde movement when said member is rotated to cause said elements to successively pass onto and off of said flat portion.

8. The pressure switch defined in claim 7, wherein the ends of said elements define a helix and said last-named means comprises a generally helical portion on said cam means merging with said flat portion and having a helix angle which is greater than the angle of helix defined by the free ends of said members.

9. In a powder charge actuated mechanism, a unitary device adapted to be detachably secured in operative position in said mechanism and to be removed after firing and replaced by a new device; comprising an outer member having means adapting it for detachable securement to said mechanism; an inner member carrying powder charge means and powder charge firing means; and an expansible bellows assembly having a closed end fitting over said powder charge means, said outer and inner members embodying means for rigidly securing the other end of said bellows thereto in gas-tight relationship therewith.

10. In a powder charge actuated mechanism of the character having an expansible chamber means and powder charge means for expanding said chamber means, means for firing said powder charge means, comprising a hollow support adapted to project into said expansible chamber means; a terminal projecting through said support in insulated relationship therewith and having means located exteriorly of said chamber for making electrical connection therewith, said terminal having a head located interiorly of said expansible chamber; a first electrode and a second electrode and insulating means clamped between said support and the head of said terminal, whereby one of said electrodes is electrically connected to said terminal and the other electrode is electrically connected to said support; and a detonator element connected to said electrodes.

11. In a fluid motor, a base; a hollow guide secured to said base; a movable member having a portion projecting into said guide; a flexible bellows disposed within said guide and having one end thereof rigidly secured to said base and having its free end, when in collapsed condition, located in proximity to said member; a powder charge in said bellows; and means for exploding said powder charge, to cause said bellows to expand and project its free end and actuate said movable member, under the guiding influence of said guide.

12. In apparatus adapted for use with a parachute assembly including a member releasing said parachute when actuated, an expansible chamber device, a charge of material capable of producing a fluid volume greater than the volume of said charge in response to a stimulus situated within said expansible chamber device, means adapted to link an expansible portion of said chamber with said release member, electrically responsive means for applying said stimulus to said charge, a barometric pressure responsive switch, a source of electric energy, and means connecting said switch and said stimulus applying means with said source of electric energy.

13. In apparatus adapted for use with a parachute assembly including a member releasing said parachute when actuated, an expansible chamber device, a charge of material capable of producing a fluid volume greater than the volume of said charge in response to a stimulus situated within said expansible chamber device, means adapted to link an expansible portion of said chamber with said release member, electrically responsive means for applying said stimulus to said charge, a barometric pressure responsive switch presenting an open circuit in the presence of pressures less than a predetermined value, means connecting said switch and said stimulus applying means in a series circuit, and connecting leads associated with said series circuit adapted for connection to a source of electric energy.

14. In an actuating mechanism, a member mounted for reciprocation and having an end face; an actuating device mounted in cooperative relationship with said member, comprising a flexible bellows normally disposed in substantially collapsed condition with an end portion thereof in proximity to the end face of said member, means for expanding said chamber to cause said end portion thereof to engage the end face of said member propelling the latter through its range of reciprocation, comprising an explosive charge of sufficient magnitude to expand said flexible bellows and of insufficient magnitude to effect rupture of the walls of said bellows, whereby the products of the explosion are retained in said expanded chamber, and means for detonating said explosive charge.

15. In a barometric circuit controlling device, a casing, a flexible lever having one end attached to said casing, a pressure responsive unit having an actuator element movable in response to changes in barometric pressure secured to said flexible lever at a point remote from said attached end, a switch adapted for actuation by movement of a control member carried by said casing in a position bringing said control member into engageable relation with said actuator, and adjustable means carried by said casing engaging said flexible lever at a point remote from said attached end and movable to flex said lever.

16. In apparatus adapted for use with a parachute assembly including a member releasing said parachute when actuated, an intermediate member engageable with said release member in a unidirectional force transmitting linkage, an actuating device responsive to variations in atmospheric pressure, and a second unidirectional force linkage connecting said actuating device and said intermediate member.

17. In apparatus adapted for use with a parachute assembly including a member releasing said parachute when actuated, an intermediate member engageable with said release member in a unidirectional force transmitting linkage, an actuating device responsive to variations in atmospheric pressure, and a second unidirectional force linkage connecting said actuating device and said intermediate member with a force transmitting sense such that movement of said intermediate member in a predetermined sense develops a force in but one of such linkages without transmitting force to the other of said linkages.

18. In apparatus adapted for use with a parachute assembly including a tension member opening said parachute when actuated, a pressure responsive switch, a source of electric energy, electrically responsive actuating means adapted for linkage with said tension member, a manually operable switch, and means connecting said pressure responsive switch, said manually operable switch and said source of electric energy with said actuating means.

19. In an actuating unit, a body having a longitudinally slotted tube; a carrier comprising a plunger longitudinally slidable in said tube; a pulley journaled in said carrier and projecting through the slotted portion of said tube; a flexible tension element anchored at one end on said body and passing around pulley means provided on said carrier; and expansible chamber means operably connected to said carrier and operable to displace the latter in a path determined by said slotted tube.

20. In an actuating mechanism, a member mounted for reciprocation and having an end face; a walled expansible chamber in cooperative relationship with said member having an end portion disposed in proximity to the end face of said member; and means for expanding said chamber and causing the end portion thereof to engage the end face of said member and propel said member through the range of reciprocation, said expanding means comprising an explosive charge of sufficient magnitude to expand said chamber but being of insufficient magnitude to effect rupture of the walls of said chamber, whereby the products of the explosion are retained in the expanded chamber.

21. In a fluid pressure motor, a base assembly; a plunger mounted for endwise reciprocation on said base; an expansible bellows having one end firmly anchored to said base and the other end disposed adjacent one end of said plunger; a powder charge disposed in said bellows of sufficient magnitude to cause said bellows to expand and displace said plunger through a full stroke when said powder charge is exploded, but of insufficient magnitude to rupture said bellows when exploded; a shell-like guide surrounding said bellows and extending for substantially the full length of the stroke of said plunger, and coacting with the external walls of said bellows to confine its free end to substantially rectilinear movement when said powder charge is exploded; and means for exploding said powder charge.

22. In a fluid pressure motor, a base assembly; a plunger mounted for endwise reciprocation on said base; an expansible bellows; a powder charge disposed in said bellows of sufficient magnitude to cause said bellows to expand and displace said plunger through a full stroke when said powder charge is exploded but of insufficient magnitude to rupture said bellows when exploded; means detachably securing said bellows to said base with one end of said bellows adjacent one end of said plunger, whereby said bellows may be removed as a unit subsequent to expansion and replaced by a new unit; and means for exploding said powder charge.

23. In a powder charge actuated mechanism, a unitary device adapted to be detachably secured in operative position in said mechanism and to be removed after firing and replaced by a new device, comprising a member carrying powder charge means and powder charge firing means, and an expansible bellows assembly having a closed end fitting over said powder charge means, the other end of said bellows being secured to said member in gas-tight relationship therewith.

24. In a powder charge actuated mechanism of the character having an expansible chamber means and powder charge means for expanding said chamber means, comprising an expansible bellows assembly having a closed end and an open end, a support adapted to project into said open end of said expansible bellows, the said bellows being secured to said support in gas-tight relationship therewith, a pair of electrodes carried by said support, means located exteriorly of said bellows for making electrical connection to said electrodes, powder charge means within said bellows, and a detonator element connected to said electrodes.

25. A powder charge actuated device comprising a member carrying powder charge means and powder charge firing means, and an expansible bellows assembly having a closed end fitting over said powder charge means, the other end of said bellows being secured to said member in gas-tight relationship therewith.

26. A powder charge actuated device as defined by claim 25 wherein the the powder charge firing means comprises a pair of electrodes carried by said member, means located exteriorly of said member for making electrical connection to said electrodes, and a detonator element connected to said electrodes.

27. In a powder charge actuated mechanism, a unitary device adapted to be detachably secured in operative position in said mechanism and to be removed after firing and replaced by a new device, comprising an outer member having means adapting it for detachable securement to said mechanism, an inner member carrying powder charge means and powder charge firing means, and an expansible bellows assembly having a closed end fitting over said powder charge means, the other end of said bellows being secured to said inner member in gas-tight relationship therewith.

WILLIAM L. W. OGDEN.
ROBERT P. BENNETT.

REFERENCES CITED

The following references are of record in the file of this patent:

UNITED STATES PATENTS

| Number | Name | Date |
|---|---|---|
| 1,229,951 | Hatch | June 12, 1917 |
| 1,295,471 | Fleury | Feb. 25, 1919 |
| 1,535,475 | Jeansen | Apr. 28, 1925 |
| 1,915,435 | Miller | June 27, 1933 |
| 1,985,890 | Ellis | Jan. 1, 1935 |
| 2,011,144 | Coffman | Aug. 13, 1935 |
| 2,100,693 | Irwin | Nov. 30, 1937 |
| 2,118,603 | Hailey | May 24, 1938 |
| 2,207,806 | Hollmann | July 16, 1940 |
| 2,289,318 | Pratt | July 7, 1942 |
| 2,299,466 | Coffman | Oct. 20, 1942 |
| 2,316,009 | Martin et al. | Apr. 6, 1943 |
| 2,353,440 | Bresee | July 11, 1944 |

FOREIGN PATENTS

| Number | Country | Date |
|---|---|---|
| 129,017 | Great Britain | July 10, 1919 |
| 278,695 | Great Britain | Apr. 5, 1928 |